United States Patent
Oh et al.

(10) Patent No.: US 10,988,486 B2
(45) Date of Patent: Apr. 27, 2021

(54) NITROGEN-CONTAINING CYCLIC COMPOUND AND COLOR CONVERSION FILM COMPRISING SAME

(71) Applicant: LG CHEM, LTD., Seoul (KR)

(72) Inventors: Hye Mi Oh, Daejeon (KR); Seijung Park, Daejeon (KR); Dong Mok Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 537 days.

(21) Appl. No.: 15/751,435

(22) PCT Filed: Sep. 23, 2016

(86) PCT No.: PCT/KR2016/010679
§ 371 (c)(1),
(2) Date: Feb. 8, 2018

(87) PCT Pub. No.: WO2017/052279
PCT Pub. Date: Mar. 30, 2017

(65) Prior Publication Data
US 2020/0199158 A1 Jun. 25, 2020

(30) Foreign Application Priority Data

Sep. 25, 2015 (KR) .................. 10-2015-0137059
Jul. 29, 2016 (KR) .................. 10-2016-0097199

(51) Int. Cl.
*C08K 5/55* (2006.01)
*C07F 5/02* (2006.01)
*F21V 8/00* (2006.01)

(52) U.S. Cl.
CPC .............. *C07F 5/022* (2013.01); *C08K 5/55* (2013.01); *G02B 6/005* (2013.01); *G02B 6/0031* (2013.01); *G02B 6/0046* (2013.01); *G02B 6/0055* (2013.01)

(58) Field of Classification Search
CPC .......... C07F 5/022; C08K 5/55; G02B 6/005; G02B 6/0031; G02B 6/0046; G02B 6/0055
See application file for complete search history.

(56) References Cited

U.S. PATENT DOCUMENTS

| 5,498,641 | A | 3/1996 | Urano et al. |
| 6,337,536 | B1 | 1/2002 | Matsubara et al. |
| 8,178,669 | B2 * | 5/2012 | Nagano .................. C07F 5/003 544/229 |
| 2010/0238381 | A1 | 9/2010 | Oshima et al. |
| 2011/0272681 | A1 | 11/2011 | Sugimoto et al. |
| 2018/0134952 | A1 | 5/2018 | Ichihashi et al. |

FOREIGN PATENT DOCUMENTS

| CN | 102272971 | 12/2011 |
| EP | 0619520 | 10/1994 |
| JP | H09118880 | 5/1997 |
| JP | 2004200162 | 7/2004 |
| JP | 2005154534 | 6/2005 |
| JP | 2006251076 | 9/2006 |
| JP | 2008109097 | 5/2008 |
| JP | 2014-136771 | 7/2014 |
| KR | 10-2000-0011622 | 2/2000 |
| KR | 10-20180012267 | 2/2018 |
| TW | 201040588 | 11/2010 |

OTHER PUBLICATIONS

Shie et al., "An Azido-BODIPY Probe for Glycosylation: Initiation of Strong Fluorescence upon Triazole Formation," J. Am. Chem. Soc. 136:9953-9961 (2014).
Wang et al., "A novel fluorescent probe for Au(III)/Au(I) ions based on an intramolecular hydroamination of a Bodipy derivative and its application to bioimaging," Chem. Commun. 48:744-746 (2012).
Verbelen et al., "Radical C—H Alkylation of BODIPY Dyes Using Potassium Trifluoroborates or Boronic Acids," Chemistry A European Journal 21: 12667-12675 (Jul. 17, 2015).

* cited by examiner

*Primary Examiner* — Timothy R Rozof
(74) *Attorney, Agent, or Firm* — Dentons US LLP

(57) ABSTRACT

The present specification relates to a compound containing nitrogen, and a color conversion film, a backlight unit, and a display device, including the same.

19 Claims, 1 Drawing Sheet

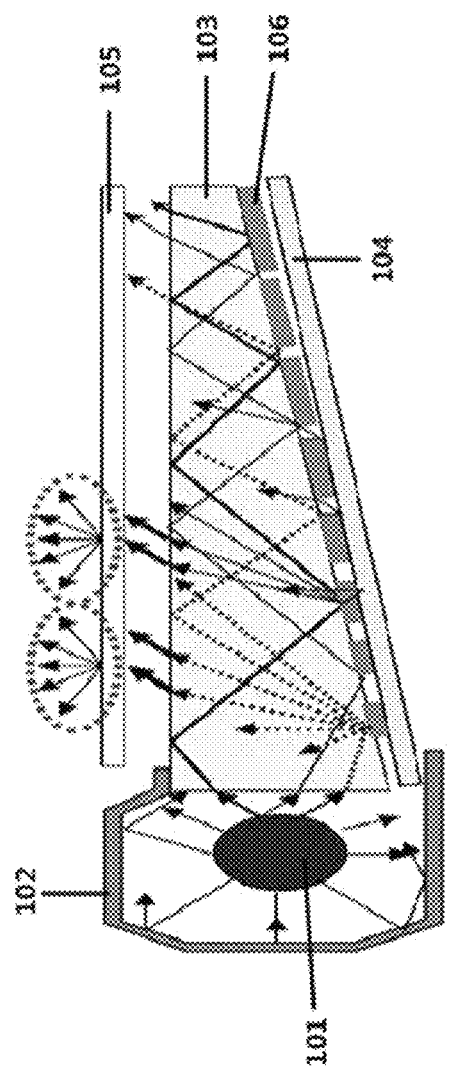

NITROGEN-CONTAINING CYCLIC COMPOUND AND COLOR CONVERSION FILM COMPRISING SAME

TECHNICAL FIELD

This application is a National Stage Application of International Application No. PCT/KR2016/010679 filed on Sep. 23, 2016, which claims priority to and the benefit of Korean Patent Application Nos. 10-2015-0137059 and 10-2016-0097199 filed in the Korean Intellectual Property Office on Sep. 25, 2015 and Jul. 29, 2016, respectively, all of which are incorporated herein in their entirety by reference for all purposes as if fully set forth herein. The present specification relates to a cyclic compound containing nitrogen, and a color conversion film, a backlight unit, and a display device, including the same.

BACKGROUND ART

The existing light emitting diodes (LEDs) are obtained by mixing a green phosphor and a red phosphor with a blue light emitting diode or mixing a yellow phosphor and a blue-green phosphor with a UV light emission light emitting diode. However, in this method, it is difficult to control colors, and accordingly, the color rendition is not good. Therefore, the color gamut deteriorates.

In order to overcome the deterioration in the color gamut and reduce the production costs, methods of implementing green and red colors have been recently attempted by using a method of producing a quantum dot in the form of a film and combining the same with a blue LED. However, cadmium-based quantum dots have safety problems, and the other quantum dots have much lower efficiencies than those of the cadmium-based quantum dots. Further, quantum dots have low stability against oxygen and water, and have a disadvantage in that the performance thereof significantly deteriorates when the quantum dots are aggregated. In addition, when quantum dots are produced, it is difficult to constantly maintain the size thereof, and thus, the production cost is high.

DETAILED DESCRIPTION OF THE INVENTION

Technical Problem

The present specification relates to a cyclic compound containing nitrogen, and a color conversion film, a backlight unit, and a display device, including the same.

Technical Solution

An exemplary embodiment of the present specification provides a compound represented by the following Chemical Formula 1.

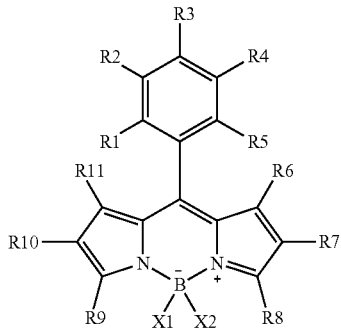

[Chemical Formula 1]

In Chemical Formula 1,

R1 to R6, R8, R9, and R11 are the same as or different from each other, and are each independently hydrogen; deuterium; a halogen group; a nitrile group; a nitro group; a hydroxy group; a carboxy group (—COOH); —C(=O)OR; an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; a substituted or unsubstituted heteroaryl group; or a substituted or unsubstituted aliphatic heterocyclic group, R7 and R10 are the same as or different from each other, and are each independently deuterium; a halogen group; a nitrile group; a nitro group; a hydroxy group; a carboxy group (—COOH); —C(=O)OR"; an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; a substituted or unsubstituted heteroaryl group; or a substituted or unsubstituted aliphatic heterocyclic group, R is a substituted or unsubstituted alkyl group; or a substituted or unsubstituted aryl group, R" is a substituted or unsubstituted alkyl group; a substituted or unsubstituted cycloalkyl group; a substituted or unsubstituted fluoroalkyl group; or a substituted or unsubstituted aryl group, at least one of R6 to R11 is a steric hindrance imparting group, and X1 and X2 are the same as or different from each other, and are each independently a halogen group; a nitrile group; a substituted or unsubstituted alkoxy group; a substituted or unsubstituted aryloxy group; or a substituted or unsubstituted aryl group, or X1 and X2 combine with each other to form a substituted or unsubstituted ring.

Another exemplary embodiment of the present specification provides a color conversion film including: a resin matrix; and the compound represented by Chemical Formula 1, which is dispersed in the resin matrix.

Still another exemplary embodiment of the present specification provides a backlight unit including the color conversion film.

Yet another exemplary embodiment of the present specification provides a display device including the backlight unit.

Advantageous Effects

The compound according to an exemplary embodiment of the present specification is a material having not only high fluorescence efficiency, but also excellent light fastness. Therefore, by using the compound described in the present specification as a fluorescent material of a color conversion film, it is possible to provide a color conversion film which has excellent brightness and color gamut, and excellent light fastness.

DESCRIPTION OF DRAWINGS

FIG. 1 is a schematic view in which a color conversion film according to an exemplary embodiment of the present specification is applied to a backlight unit.
101: Side chain-type light source
102: Reflective plate
103: Light guide plate
104: Reflective layer
105: Color conversion film
106: Light dispersion pattern

BEST MODE

Hereinafter, the present specification will be described in more detail.

An exemplary embodiment of the present specification provides the compound represented by Chemical Formula 1. The compound according to an exemplary embodiment of the present specification may be used as an organic fluorescent material. In particular, as a group, which imparts steric hindrance, is located at $1^{st}$, $3^{rd}$, $5^{th}$ and $7^{th}$ positions of a core structure, that is, R6, R8, R9, and R11, the light fastness is significantly improved.

In an exemplary embodiment of the present invention, the steric hindrance imparting group is —(=O)OR; a substituted or unsubstituted monocyclic or polycyclic cycloalkyl group; or a substituted or unsubstituted monocyclic or polycyclic aliphatic heterocyclic group, and R is a substituted or unsubstituted alkyl group or a substituted or unsubstituted aryl group.

When one part "includes" one constituent element in the present specification, unless otherwise specifically described, this does not mean that another constituent element is excluded, but means that another constituent element may be further included.

When one member is disposed "on" another member in the present specification, this includes not only a case where the one member is brought into contact with the another member, but also a case where still another member is present between the two members.

In the present specification, examples of the substituents will be described below, but the present specification is not limited thereto.

The term "substitution" means that a hydrogen atom bonded to a carbon atom of a compound is changed into another substituent, and a position to be substituted is not limited as long as the position is a position at which the hydrogen atom is substituted, that is, a position at which the substituent may be substituted, and when two or more are substituted, the two or more substituents may be the same as or different from each other.

In the present specification, the term "substituted or unsubstituted" means being substituted with one or two or more substituents selected from the group consisting of deuterium; a halogen group; a nitrile group; a nitro group; an imide group; an amide group; a carbonyl group; a carboxy group (—COOH); an ether group; an ester group; a hydroxy group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; and a substituted or unsubstituted heterocyclic group or being substituted with a substituent to which two or more substituents are linked among the substituents exemplified above, or having no substituent. For example, "the substituent to which two or more substituents are linked" may be a biphenyl group. That is, the biphenyl group may also be an aryl group, and may be interpreted as a substituent to which two phenyl groups are linked.

In the present specification,  means a moiety bonded to another substituent or a binding portion.

In the present specification, a halogen group may be fluoro, chlorine, bromine, or iodine.

In the present specification, the number of carbon atoms of an imide group is not particularly limited, but is preferably 1 to 30. Specifically, the imide group may be a compound having the following structures, but is not limited thereto.

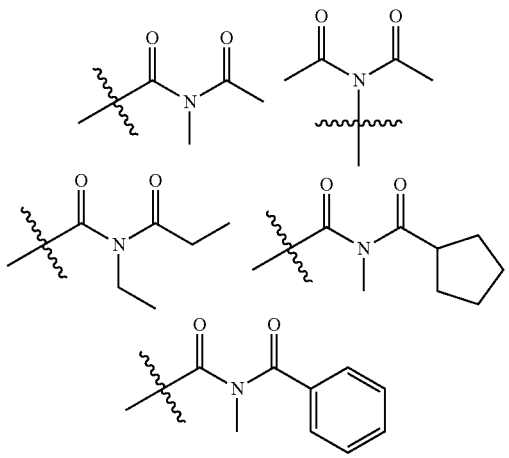

In the present specification, for an amide group, the nitrogen of the amide group may be substituted with hydrogen, a straight-chained, branch-chained, or cyclic alkyl group having 1 to 30 carbon atoms, or an aryl group having 6 to 30 carbon atoms. Specifically, the amide group may be a compound having the following structural formulae, but is not limited thereto.

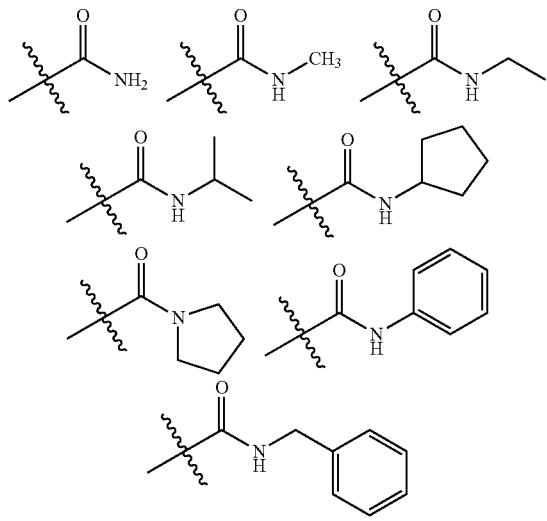

In the present specification, the number of carbon atoms of a carbonyl group is not particularly limited, but is preferably 1 to 30. Specifically, the carbonyl group may be a compound having the following structures, but is not limited thereto.

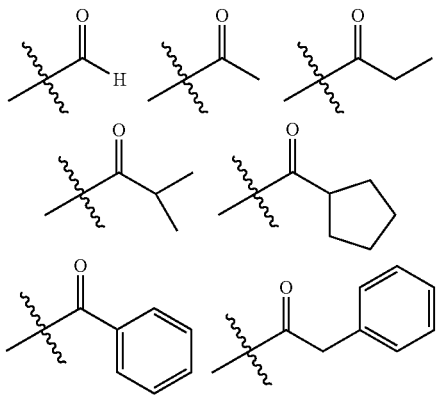

In the present specification, for an ether group, the oxygen of the ether may be substituted with a straight-chained, branch-chained, or cyclic alkyl group having 1 to 25 carbon atoms, or a monocyclic or polycyclic aryl group having 6 to 30 carbon atoms.

In the present specification, for an ester group, the oxygen of the ester group may be substituted with a straight-chained, branch-chained, or cyclic alkyl group having 1 to 25 carbon atoms, or a monocyclic or polycyclic aryl group having 6 to 30 carbon atoms. Specifically, the ester group may be a compound having the following structural formulae, but is not limited thereto.

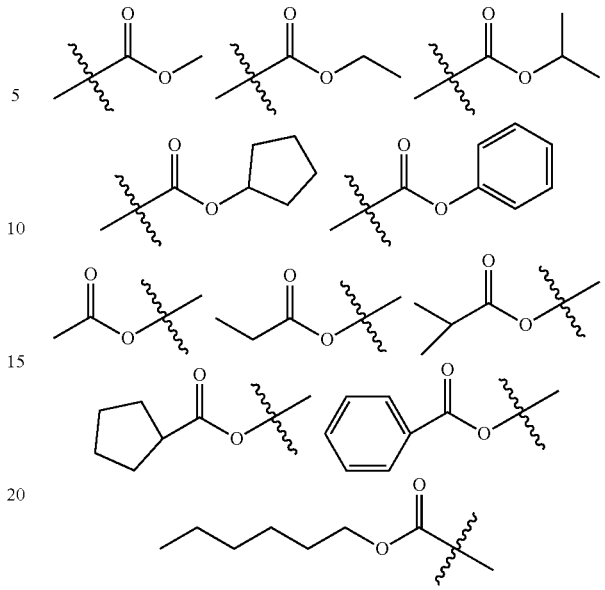

In the present specification, the alkyl group may be straight-chained or branch-chained, and the number of carbon atoms thereof is not particularly limited, but is preferably 1 to 30. Specific examples thereof include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, and the like, but are not limited thereto.

In the present specification, a cycloalkyl group is not particularly limited, but has preferably 3 to 30 carbon atoms, and specific examples thereof include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, and the like, but are not limited thereto.

In the present specification, the alkoxy group may be straight-chained, branch-chained, or cyclic. The number of carbon atoms of the alkoxy group is not particularly limited, but is preferably 1 to 30. Specific examples thereof include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy, and the like, but are not limited thereto.

In the present specification, an amine group may be selected from the group consisting of —NH$_2$; an alkylamine group; an N-arylalkylamine group; an arylamine group; an N-arylheteroarylamine group; an N-alkylheteroarylamine group; and a heteroarylamine group, and the number of carbon atoms thereof is not particularly limited, but is preferably 1 to 30. Specific examples of the amine group include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, an N-phenylnaphthylamine group, a ditolylamine group, an N-phenyltolylamine group, a triphenylamine group, and the like, but are not limited thereto.

In the present specification, an N-alkylarylamine group means an amine group in which an alkyl group and an aryl group are substituted with N of the amine group.

In the present specification, the N-arylheteroarylamine group means an amine group in which an aryl group and a heteroaryl group are substituted with N of the amine group.

In the present specification, the N-alkylheteroarylamine group means an amine group in which an alkyl group and a heteroarylamine group are substituted with N of the amine group.

In the present specification, the alkyl group in the alkylamine group, the N-alkylarylamine group, the alkylthioxy group, the alkylsulfoxy group, and the N-alkylheteroarylamine group is the same as the above-described examples of the alkyl group. Specifically, examples of the alkylthioxy group include a methylthioxy group, an ethylthioxy group, a tert-butylthioxy group, a hexylthioxy group, an octylthioxy group, and the like, and examples of the alkylsulfoxy group include mesyl, an ethylsulfoxy group, a propylsulfoxy group, a butylsulfoxy group, and the like, but are not limited thereto.

In the present specification, the alkenyl group may be straight-chained or branch-chained, and the number of carbon atoms thereof is not particularly limited, but is preferably 2 to 30. Specific examples thereof include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group, and the like, but are not limited thereto.

In the present specification, specific examples of a silyl group include a trimethylsilyl group, a triethylsilyl group, a t-butyldimethylsilyl group, a vinyldimethylsilyl group, a propyldimethylsilyl group, a triphenylsilyl group, a diphenylsilyl group, a phenylsilyl group, and the like, but are not limited thereto.

In the present specification, a boron group may be —BR$_{100}$R$_{101}$, and R$_{100}$ and R$_{101}$ are the same as or different from each other, and may be each independently selected from the group consisting of hydrogen; deuterium; a halogen group; a nitrile group; a substituted or unsubstituted monocyclic or polycyclic cycloalkyl group having 3 to 30 carbon atoms; a substituted or unsubstituted straight-chained or branch-chained alkyl group having 1 to 30 carbon atoms; a substituted or unsubstituted monocyclic or polycyclic aryl group having 6 to 30 carbon atoms; and a substituted or unsubstituted monocyclic or polycyclic heteroaryl group having 2 to 30 carbon atoms.

In the present specification, specific examples of a phosphine oxide group include a diphenylphosphine oxide group, dinaphthylphosphine oxide, and the like, but are not limited thereto.

In the present specification, an aryl group is not particularly limited, but has preferably 6 to 30 carbon atoms, and the aryl group may be monocyclic or polycyclic.

When the aryl group is a monocyclic aryl group, the number of carbon atoms thereof is not particularly limited, but is preferably 6 to 30. Specific examples of the monocyclic aryl group include a phenyl group, a biphenyl group, a terphenyl group, and the like, but are not limited thereto.

When the aryl group is a polycyclic aryl group, the number of carbon atoms thereof is not particularly limited, but is preferably 10 to 30. Specific examples of the polycyclic aryl group include a naphthyl group, an anthracenyl group, a phenanthryl group, a triphenyl group, a pyrenyl group, a perylenyl group, a chrysenyl group, a fluorenyl group, and the like, but are not limited thereto.

In the present specification, the fluorenyl group may be substituted, and adjacent substituents may combine with each other to form a ring.

When the fluorenyl group is substituted, the fluorenyl group may be

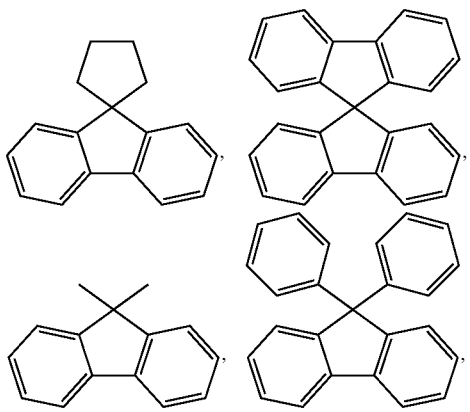

and the like. However, the fluorenyl group is not limited thereto.

In the present specification, the aryl group in the aryloxy group, the arylthioxy group, the arylsulfoxy group, the N-arylalkylamine group, the N-arylheteroarylamine group, and the arylphosphine group is the same as the above-described examples of the aryl group. Specifically, examples of the aryloxy group include a phenoxy group, a p-tolyloxy group, an m-tolyloxy group, a 3,5-dimethyl-phenoxy group, a 2,4,6-trimethylphenoxy group, a p-tert-butylphenoxy group, a 3-biphenyloxy group, a 4-biphenyloxy group, a 1-naphthyloxy group, a 2-naphthyloxy group, a 4-methyl-1-naphthyloxy group, a 5-methyl-2-naphthyloxy group, a 1-anthryloxy group, a 2-anthryloxy group, a 9-anthryloxy group, a 1-phenanthryloxy group, a 3-phenanthryloxy group, a 9-phenanthryloxy group, and the like, examples of the arylthioxy group include a phenylthioxy group, a 2-methylphenylthioxy group, a 4-tert-butylphenylthioxy group, and the like, and examples of the arylsulfoxy group include a benzenesulfoxy group, a p-toluenesulfoxy group, and the like, but the examples are not limited thereto.

In the present specification, examples of an arylamine group include a substituted or unsubstituted monoarylamine group, a substituted or unsubstituted diarylamine group, or a substituted or unsubstituted triarylamine group. The aryl group in the arylamine group may be a monocyclic aryl group or a polycyclic aryl group. The arylamine group including two or more aryl groups may include a monocyclic aryl group, a polycyclic aryl group, or both a monocyclic aryl group and a polycyclic aryl group. For example, the aryl group in the arylamine group may be selected from the above-described examples of the aryl group.

In the present specification, a heteroaryl group includes one or more of an atom other than carbon, that is, a heteroatom, and specifically, the heteroatom may include one or more atoms selected from the group consisting of O, N, Se, and S, and the like. The number of carbon atoms thereof is not particularly limited, but is preferably 2 to 30, and the heteroaryl group may be monocyclic or polycyclic. Examples of the heterocyclic group include a thiophene group, a furanyl group, a pyrrole group, an imidazolyl group, a thiazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a qinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a phenanthrolinyl group (phenanthroline), a thiazolyl group, an isoxazolyl group, an oxadiazolyl group, a thiadiazolyl group, a benzothiazolyl group, a phenothiazinyl group, a dibenzofuranyl group, and the like, but are not limited thereto.

In the present specification, examples of a heteroarylamine group include a substituted or unsubstituted monoheteroarylamine group, a substituted or unsubstituted diheteroarylamine group, or a substituted or unsubstituted triheteroarylamine group. The heteroarylamine group including two or more heteroaryl groups may include a monocyclic heteroaryl group, a polycyclic heteroaryl group, or both a monocyclic heteroaryl group and a polycyclic heteroaryl group. For example, the heteroaryl group in the heteroarylamine group may be selected from the above-described examples of the heteroaryl group.

In the present specification, examples of the heteroaryl group in the N-arylheteroarylamine group and the N-alkylheteroarylamine group are the same as the above-described examples of the heteroaryl group.

In the present specification, the heterocyclic group may be monocyclic or polycyclic, may be an aromatic ring, an aliphatic ring, or a fused ring of the aromatic ring and the aliphatic ring, and may be selected from the examples of the heteroaryl group.

In the present specification, the aliphatic heterocyclic group may be monocyclic or polycyclic, and specifically, may be a tetrahydropyran group, but is not limited thereto.

According to an exemplary embodiment of the present specification, at least two of R6, R8, R9, and R11 are the same as or different from each other, and are each independently —(=O)OR; a substituted or unsubstituted monocyclic or polycyclic cycloalkyl group; or a substituted or unsubstituted monocyclic or polycyclic aliphatic heterocyclic group, R is a substituted or unsubstituted alkyl group or a substituted or unsubstituted aryl group, and the others of R6, R8, R9, and R11 are hydrogen; deuterium; a nitrile group; or a substituted or unsubstituted alkyl group.

According to an exemplary embodiment of the present specification, at least one of R6 and R8 and at least one of R9 and R11 are the same as or different from each other, and are each independently —(=O)OR; a substituted or unsubstituted monocyclic or polycyclic cycloalkyl group; or a substituted or unsubstituted monocyclic or polycyclic aliphatic heterocyclic group, R is a substituted or unsubstituted alkyl group or a substituted or unsubstituted aryl group, and the others of R6, R8, R9, and R11 are hydrogen; deuterium; a nitrile group; or a substituted or unsubstituted alkyl group.

According to an exemplary embodiment of the present specification, at least one of R6 and R8 and at least one of R9 and R11 are the same as or different from each other, and are each independently —(=O)OR; a substituted or unsubstituted monocyclic or polycyclic cycloalkyl group; or a substituted or unsubstituted monocyclic or polycyclic aliphatic heterocyclic group, R is a substituted or unsubstituted alkyl group or a substituted or unsubstituted aryl group, and the others of R6, R8, R9, and R11 are hydrogen; deuterium; a nitrile group; or a substituted or unsubstituted methyl group.

According to an exemplary embodiment of the present specification, at least one of R6 and R8 and at least one of R9 and R11 are the same as or different from each other, and are each independently —(=O)OCH$_3$; —C(=O)OCH$_2$CH$_3$; a substituted or unsubstituted cyclohexyl group; a substituted or unsubstituted cyclopentyl group; a substituted or unsubstituted cycloheptyl group; a substituted or unsubstituted cyclooctyl group; a substituted or unsubstituted bicycloheptyl group; a substituted or unsubstituted bicyclooctyl group; a substituted or unsubstituted tetrahydropyran group; or a substituted or unsubstituted adamantane group, and the others of R6, R8, R9, and R11 are hydrogen; deuterium; a nitrile group; or a substituted or unsubstituted methyl group.

According to an exemplary embodiment of the present specification, at least one of R6 and R8 and at least one of R9 and R11 are the same as or different from each other, and are each independently —(=O)OCH$_3$; —C(=O)OCH$_2$CH$_3$; a cyclohexyl group which is unsubstituted or substituted with an alkyl group or an alkoxy group; a cyclopentyl group; a cycloheptyl group; a cyclooctyl group; a bicycloheptyl group which is unsubstituted or substituted with an aryl group; a bicyclooctyl group; a tetrahydropyran group; or a substituted or unsubstituted adamantane group, and the others of R6, R8, R9, and R11 are hydrogen; deuterium; a nitrile group; or a substituted or unsubstituted methyl group.

According to an exemplary embodiment of the present specification, at least one of R6 and R8 and at least one of R9 and R11 are the same as or different from each other, and are each independently —(=O)OCH$_3$; —C(=O)OCH$_2$CH$_3$; a cyclohexyl group which is unsubstituted or substituted with a methyl group or a methoxy group; a cyclopentyl group; a cycloheptyl group; a cyclooctyl group; a bicycloheptyl group which is unsubstituted or substituted with a phenyl group; a tetrahydropyran group; or a substituted or unsubstituted adamantane group, and the others of R6, R8, R9, and R11 are hydrogen; deuterium; a nitrile group; or a substituted or unsubstituted methyl group.

According to an exemplary embodiment of the present specification, R8 and R9 are the same as or different from each other, and are each independently —(=O)OR; a substituted or unsubstituted monocyclic or polycyclic cycloalkyl group; or a substituted or unsubstituted monocyclic or polycyclic aliphatic heterocyclic group, and R is a substituted or unsubstituted alkyl group or a substituted or unsubstituted aryl group.

According to an exemplary embodiment of the present specification, R8 and R9 are the same as or different from each other, and are each independently —(=O)OCH$_3$; —C(=O)OCH$_2$CH$_3$; a cyclohexyl group which is unsubstituted or substituted with a methyl group or a methoxy group; a cyclopentyl group; a cycloheptyl group; a cyclooctyl group; a bicycloheptyl group which is unsubstituted or substituted with a phenyl group; a tetrahydropyran group; or a substituted or unsubstituted adamantane group, and the others of R6 to R11 are hydrogen; deuterium; a nitrile group; or a substituted or unsubstituted methyl group.

According to an exemplary embodiment of the present specification, R7 and R10 are the same as or different from each other, and are each independently a nitrile group or —C(=O)OR", and R" is a substituted or unsubstituted alkyl group; a substituted or unsubstituted cycloalkyl group; a substituted or unsubstituted fluoroalkyl group; or a substituted or unsubstituted aryl group.

According to an exemplary embodiment of the present specification, R7 and R10 are the same as or different from each other, and are each independently a nitrile group; or —(=O)OR", and R" is an alkyl group; a cycloalkyl group; a fluoroalkyl group; or an aryl group.

According to an exemplary embodiment of the present specification, R7 and R10 are the same as or different from each other, and are each independently a nitrile group; or —(=O)OR", and R" is an alkyl group having 1 to 20 carbon atoms; a cycloalkyl group having 3 to 20 carbon atoms; a fluoroalkyl group having 1 to 20 carbon atoms; or an aryl group having 6 to 20 carbon atoms.

According to an exemplary embodiment of the present specification, R7 and R10 are the same as or different from each other, and are each independently a nitrile group; or —(=O)OR", and R" is a methyl group; an ethyl group; a cyclohexane group; a trifluoromethyl group; or a phenyl group.

According to an exemplary embodiment of the present specification, R7 and R10 are the same as or different from each other, and are each independently a nitrile group; or —(=O)OR", and R" is a methyl group; a cyclohexane group; a trifluoromethyl group; or a phenyl group.

According to an exemplary embodiment of the present specification, R1 to R5 are the same as or different from each other, and are each hydrogen; deuterium; a substituted or unsubstituted alkyl group; a substituted or unsubstituted alkoxy group; or —C(=O)OR', and R' is an alkyl group having 1 to 20 carbon atoms or an aryl group having 6 to 20 carbon atoms.

According to an exemplary embodiment of the present specification, R1 to R5 are the same as or different from each other, and are each hydrogen; deuterium; a substituted or unsubstituted alkyl group; a substituted or unsubstituted alkoxy group; or —C(=O)OR', and R' is an alkyl group having 1 to 20 carbon atoms.

According to an exemplary embodiment of the present specification, R1 to R5 are the same as or different from each other, and are each hydrogen; —OCH$_3$ or —CO$_2$CH$_3$.

According to an exemplary embodiment of the present specification, X1 and X2 are the same as or different from each other, and are each a halogen group.

According to an exemplary embodiment of the present specification, X1 and X2 are the same as or different from each other, and are each a fluorine group.

According to an exemplary embodiment of the present specification, the combination of R1 to R6, R8, R9, R11, X1, and X2 may be selected from 1A to 41A of the following Table 1, and the combination of R7 and R10 may be selected from 1B to 15B of the following Table 2.

TABLE 1

| Combination | R1 to R5 | R6 | R8 | R9 | R11 | X1, X2 |
|---|---|---|---|---|---|---|
| 1A | —H | cyclohexyl | cyclohexyl | cyclohexyl | cyclohexyl | —F |
| 2A | —H | cyclohexyl-CH$_3$ | cyclohexyl-CH$_3$ | cyclohexyl-CH$_3$ | cyclohexyl-CH$_3$ | —F |
| 3A | —H | cyclohexyl | cyclohexyl-CH$_3$ | cyclohexyl-CH$_3$ | cyclohexyl | —F |
| 4A | —H | cyclohexyl-CH$_3$ | cyclohexyl-CH$_3$ | cyclohexyl-CH$_3$ | cyclohexyl | —F |

TABLE 1-continued

| Combination | R1 to R5 | R6 | R8 | R9 | R11 | X1, X2 |
|---|---|---|---|---|---|---|
| 5A | —H | 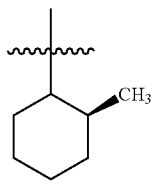 [SMILES: *C1CCCC[C@@H]1C] 2-methylcyclohexyl | 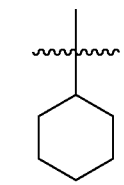 cyclohexyl | 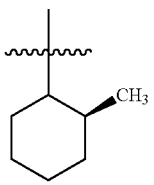 [SMILES: *C1CCCC[C@@H]1C] 2-methylcyclohexyl | 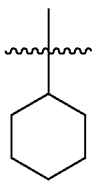 cyclohexyl | —F |
| 6A | —H | —CH₃ | 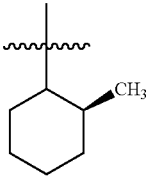 [SMILES: *C1CCCC[C@@H]1C] 2-methylcyclohexyl | 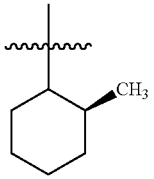 [SMILES: *C1CCCC[C@@H]1C] 2-methylcyclohexyl | —CH₃ | —F |
| 7A | —H | —CH₃ | 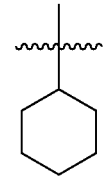 cyclohexyl | 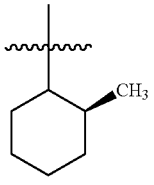 [SMILES: *C1CCCC[C@@H]1C] 2-methylcyclohexyl | —CH₃ | —F |
| 8A | —H | 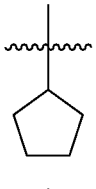 cyclopentyl | 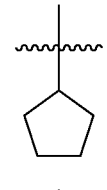 cyclopentyl | 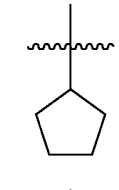 cyclopentyl | 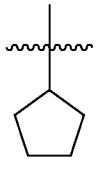 cyclopentyl | —F |
| 9A | —H | 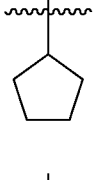 cyclopentyl | 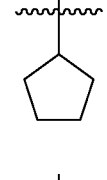 cyclopentyl | 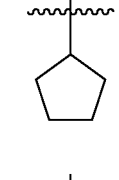 cyclopentyl | 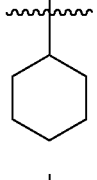 cyclohexyl | —F |
| 10A | —H | 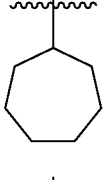 cycloheptyl | 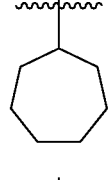 cycloheptyl | 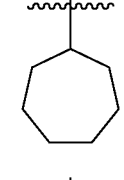 cycloheptyl |  cycloheptyl | —F |
| 11A | —H | 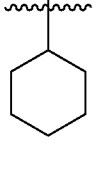 cyclohexyl | 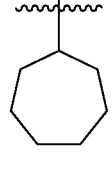 cycloheptyl | 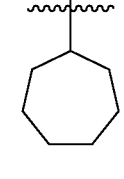 cycloheptyl | 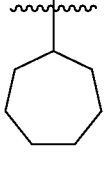 cycloheptyl | —F |
| 12A | —H | 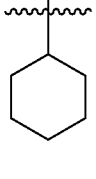 cyclohexyl | 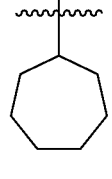 cycloheptyl | 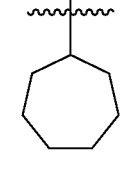 cycloheptyl | 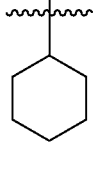 cyclohexyl | —F |

TABLE 1-continued

| Combination | R1 to R5 | R6 | R8 | R9 | R11 | X1, X2 |
|---|---|---|---|---|---|---|
| 13A | —H | 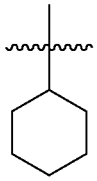 cyclohexyl | 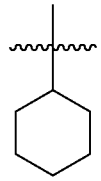 cyclohexyl | 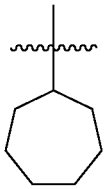 cycloheptyl | 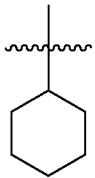 cyclohexyl | —F |
| 14A | —H | 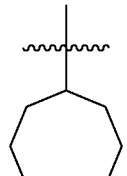 cyclooctyl | 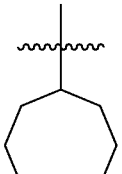 cyclooctyl | 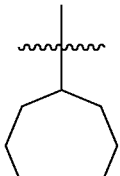 cyclooctyl | 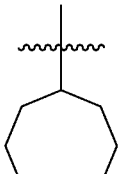 cyclooctyl | —F |
| 15A | —H | 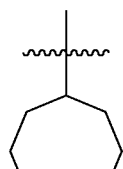 cyclooctyl | 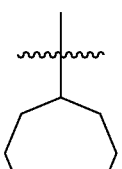 cyclooctyl | 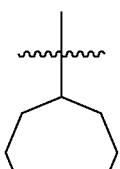 cyclooctyl | 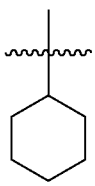 cyclohexyl | —F |
| 16A | —H | 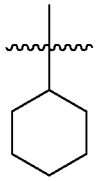 cyclohexyl | 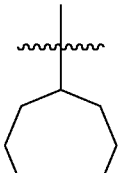 cyclooctyl | 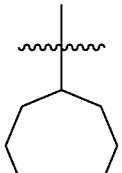 cyclooctyl | 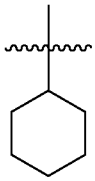 cyclohexyl | —F |
| 17A | —H | 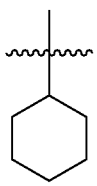 cyclohexyl | 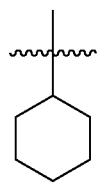 cyclohexyl | 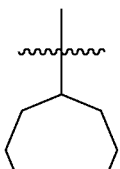 cyclooctyl | 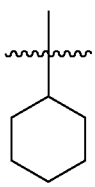 cyclohexyl | —F |
| 18A | —H | 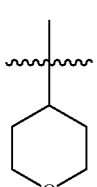 tetrahydropyranyl | 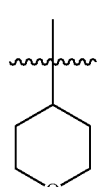 tetrahydropyranyl | 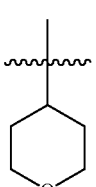 tetrahydropyranyl | 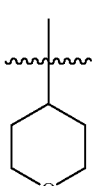 tetrahydropyranyl | —F |
| 19A | —H | 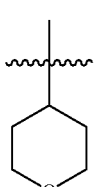 tetrahydropyranyl | 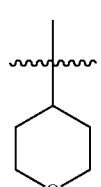 tetrahydropyranyl | 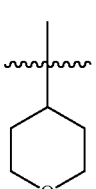 tetrahydropyranyl | 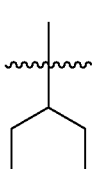 cyclohexyl | —F |

TABLE 1-continued

| Combination | R1 to R5 | R6 | R8 | R9 | R11 | X1, X2 |
|---|---|---|---|---|---|---|
| 20A | —H | cyclohexyl | tetrahydropyran (O at bottom) | tetrahydropyran (O at bottom) | cyclohexyl | —F |
| 21A | —H | cyclohexyl | cyclohexyl | tetrahydropyran (O at bottom) | cyclohexyl | —F |
| 22A | —H | bicyclo[2.2.1]heptyl | bicyclo[2.2.1]heptyl | bicyclo[2.2.1]heptyl | bicyclo[2.2.1]heptyl | —F |
| 23A | —H | cyclohexyl | bicyclo[2.2.1]heptyl | bicyclo[2.2.1]heptyl | bicyclo[2.2.1]heptyl | —F |
| 24A | —H | cyclohexyl | bicyclo[2.2.1]heptyl | bicyclo[2.2.1]heptyl | cyclohexyl | —F |
| 25A | —H | cyclohexyl | cyclohexyl | bicyclo[2.2.1]heptyl | cyclohexyl | —F |
| 26A | —H | cyclohexyl | cyclohexyl (Me substituent) | bicyclo[2.2.1]heptyl | cyclohexyl | —F |
| 27A | —H | cycloheptyl | cyclohexyl (Me substituent) | bicyclo[2.2.1]heptyl | cyclohexyl | —F |

TABLE 1-continued
| Combination | R1 to R5 | R6 | R8 | R9 | R11 | X1, X2 |
|---|---|---|---|---|---|---|
| 28A | —H | 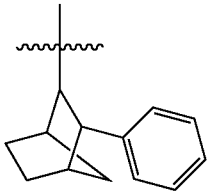 [SMILES: *C1C2CCC(C2)C1c1ccccc1] | 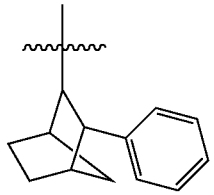 [SMILES: *C1C2CCC(C2)C1c1ccccc1] | 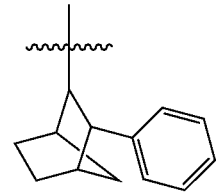 [SMILES: *C1C2CCC(C2)C1c1ccccc1] | 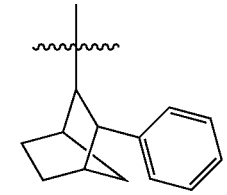 [SMILES: *C1C2CCC(C2)C1c1ccccc1] | —F |
| 29A | —H | 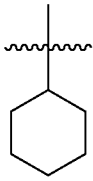 | 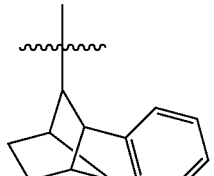 | 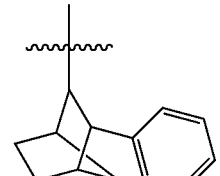 | 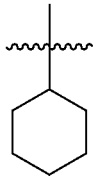 | —F |
| 30A | —H | 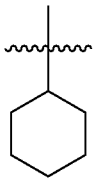 | 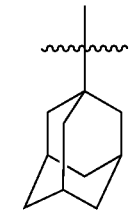 | 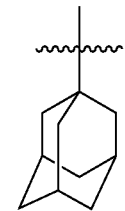 [SMILES: *C12CC3CC(CC(C3)C1)C2] | 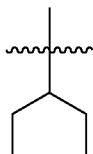 | —F |
| 31A | —H | 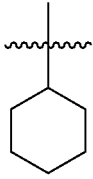 | 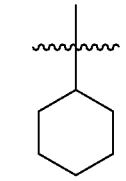 | 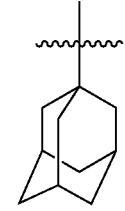 [SMILES: *C12CC3CC(CC(C3)C1)C2] | 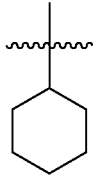 | —F |
| 32A | —H | —CH$_3$ | 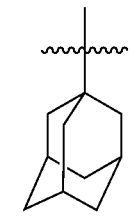 | 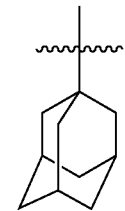 [SMILES: *C12CC3CC(CC(C3)C1)C2] | —CH$_3$ | —F |
| 33A | —H | —CH$_3$ | 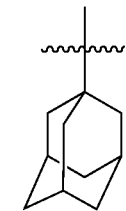 | 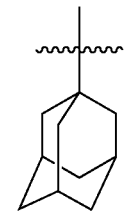 [SMILES: *C12CC3CC(CC(C3)C1)C2] | 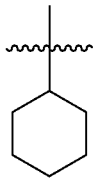 | —F |
| 34A | —H | 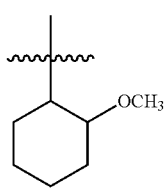 | 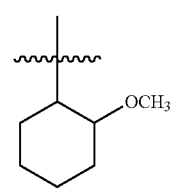 | 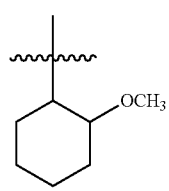 [SMILES: *C1CCCCC1OC] | 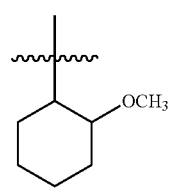 [SMILES: *C1CCCCC1OC] | —F |

TABLE 1-continued

| Combination | R1 to R5 | R6 | R8 | R9 | R11 | X1, X2 |
|---|---|---|---|---|---|---|
| 35A | —H | 2-methoxycyclohexyl | 2-methoxycyclohexyl | 2-methoxycyclohexyl | cyclohexyl | —F |
| 36A | —H | cyclohexyl | 2-methoxycyclohexyl | 2-methoxycyclohexyl | cyclohexyl | —F |
| 37A | —H | cyclohexyl | cyclohexyl | 2-methoxycyclohexyl | cyclohexyl | —F |
| 38A | —H | 2-methoxycyclohexyl | cyclohexyl | 2-methoxycyclohexyl | cyclohexyl | —F |
| 39A | —H | 2-methoxycyclohexyl | 2-methylcyclohexyl | 2-methylcyclohexyl | 2-methoxycyclohexyl | —F |
| 40A | —H | 2-methoxycyclohexyl | 2-methylcyclohexyl | 2-methylcyclohexyl | cyclohexyl | —F |
| 41A | —H | 2-methoxycyclohexyl | cyclohexyl | 2-methylcyclohexyl | cyclohexyl | —F |

TABLE 2

| Combination | R7 | R10 |
|---|---|---|
| 1B | —CN | —CN |
| 2B | —CO$_2$CH$_3$ | —CO$_2$CH$_3$ |
| 3B | —CO$_2$C$_6$H$_{11}$ | —CO$_2$C$_6$H$_{11}$ |
| 4B | —CO$_2$C$_6$H$_5$ | —CO$_2$C$_6$H$_5$ |
| 5B | —CF$_3$ | —CF$_3$ |
| 6B | —CN | —CO$_2$CH$_3$ |
| 7B | —CN | —CO$_2$C$_6$H$_{11}$ |
| 8B | —CN | —CO$_2$C$_6$H$_5$ |
| 9B | —CN | —CF$_3$ |
| 10B | —CO$_2$CH$_3$ | —CO$_2$C$_6$H$_{11}$ |

TABLE 2-continued

| Combination | R7 | R10 |
|---|---|---|
| 11B | —CO$_2$CH$_3$ | —CO$_2$C$_6$H$_5$ |
| 12B | —CO$_2$CH$_3$ | —CF$_3$ |
| 13B | —CO$_2$C$_6$H$_{11}$ | —CF$_3$ |
| 14B | —CO$_2$C$_6$H$_{11}$ | —CO$_2$C$_6$H$_5$ |
| 15B | —CO$_2$C$_6$H$_5$ | —CF$_3$ |

An exemplary embodiment of the present specification provides a color conversion film including: a resin matrix; and the compound represented by Chemical Formula 1, which is dispersed in the resin matrix.

The content of the compound represented by Chemical Formula 1 in the color conversion film may be within a range of 0.001 to 10 wt %.

The color conversion film may also include one or two or more of the compounds represented by Chemical Formula 1.

The color conversion film may further include an additional fluorescent material in addition to the compound represented by Chemical Formula 1. When a light source which emits blue light is used, it is preferred that the color conversion film includes both a fluorescent material which emits green light and a fluorescent material which emits red light. Further, when a light source which emits blue light and green light is used, the color conversion film may include only a fluorescent material which emits red light. However, the color conversion film is not limited thereto, and even when a light source which emits blue light is used, the color conversion film may include only a compound which emits red light in the case where a separate film including a fluorescent material which emits green light is stacked. Conversely, even when a light source which emits blue light is used, the color conversion film may include only a compound which emits green light in the case where a separate film including a fluorescent material which emits red light is stacked.

The color conversion film may further include a resin matrix; and an additional layer including a compound which is dispersed in the resin matrix and emits light having a wavelength different from that of the compound represented by Chemical Formula 1. The compound which emits light having a wavelength different from that of the compound represented by Chemical Formula 1 may also be the compound expressed as Chemical Formula 1, and may also be another publicly-known fluorescent material.

It is preferred that a material for the resin matrix is a thermoplastic polymer or a thermosetting polymer. Specifically, as the material for the resin matrix, it is possible to use a poly(meth)acrylic material such as polymethylmethacrylate (PMMA), a polycarbonate (PC)-based material, a polystyrene (PS)-based material, a polyarylene (PAR)-based material, a polyurethane (TPU)-based material, a styrene-acrylonitrile (SAN)-based material, an alpha methyl styrene acrylonitrile (AMSAN)-based material, a phenylmaleicimide styrene acrylonitrile (PMISAN)-based material, a polyvinylidenefluoride (PVDF)-based material, a modified-polyvinylidenefluoride (modified-PVDF)-based material, and the like.

According to an exemplary embodiment of the present specification, the color conversion film according to the above-described exemplary embodiment additionally includes light diffusion particles. By dispersing light diffusion particles in the color conversion film instead of a light diffusion film used in the related art in order to improve brightness, an attaching process may be omitted, and a higher brightness may be exhibited as compared to the case where a separate light diffusion film is used.

As the light diffusion particle, particles having a high refractive index with a resin matrix may be used, and it is possible to use, for example, TiO$_2$, silica, borosilicate, alumina, sapphire, air or another gas, air- or gas-filled hollow beads or particles (for example, air/gas-filled glass or polymer); polymer particles including polystyrene, polycarbonate, polymethylmethacrylate, acryl, methyl methacrylate, styrene, a melamine resin, a formaldehyde resin, or a melamine and formaldehyde resin, or any suitable combination thereof.

The particle diameter of the light diffusion particle may be within a range of 0.1 µm to 5 µm, for example, within a range of 0.3 µm to 1 µm. The content of the light diffusion particle may be determined, if necessary, and may be, for example, within a range of about 1 to 30 parts by weight based on 100 parts by weight of the resin matrix.

The color conversion film according to the above-described exemplary embodiment may have a thickness of 2 µm to 200 µm. In particular, the color conversion film may exhibit high brightness even in a small thickness of 2 µm to 20 µm. This is because the content of the fluorescent material molecule included in a unit volume is higher than that of a quantum dot.

In the color conversion film according to the above-described exemplary embodiment, a substrate may be provided on one surface of the color conversion film. The substrate may function as a support when preparing the color conversion film. The kind of substrate is not particularly limited, and the material or thickness of the substrate is not limited as long as the substrate is transparent and may function as the support. Here, transparency means that the transmittance of visible light is 70% or more. For example, as the substrate, a PET film may be used.

The above-described color conversion film may be prepared by coating a resin solution, in which the above-described compound represented by Chemical Formula 1 is dissolved, on a substrate and drying the resin solution, or extruding the above-described compound represented by Chemical Formula 1 together with the resin to produce a film.

Since the above-described compound represented by Chemical Formula 1 is dissolved in the resin solution, the compound represented by Chemical Formula 1 is uniformly distributed in the solution. This is different from a process of preparing a quantum dot film, which requires a separate dispersing process.

The preparation method of the resin solution in which the compound represented by Chemical Formula 1 is dissolved is not particularly limited as long as the above-described compound represented by Chemical Formula 1 is present in a state where the resin is dissolved in the solution.

According to an example, the resin solution in which the compound represented by Chemical Formula 1 is dissolved may be prepared by a method including: dissolving the compound represented by Chemical Formula 1 in a solvent to prepare a first solution, dissolving a resin in a solvent to prepare a second solution, and mixing the first solution with the second solution. When the first solution and the second solution are mixed, it is preferred to uniformly mix the solutions. However, the method is not limited thereto, and it is possible to use a method of simultaneously adding a compound represented by Chemical Formula 1 and a resin to a solvent to dissolve the compound and the resin, a method of dissolving the compound represented by Chemical Formula 1 in a solvent, and subsequently adding the resin thereto to dissolve the resin, a method of dissolving the resin in a solvent, and subsequently adding the compound represented by Chemical Formula 1 thereto to dissolve the compound, and the like.

As the resin included in the solution, it is possible to use the above-described resin matrix material, a monomer which is curable by the resin matrix resin, or a mixture thereof. Examples of the monomer which is curable by the resin matrix resin include a (meth)acrylic monomer, and the monomer may be formed as a resin matrix material by UV curing. When a curable monomer is used as described above, an initiator required for curing may be further added, if necessary.

The solvent is not particularly limited, and is not particularly limited as long as the solvent may be removed by a subsequent drying while not adversely affecting the coating process. As a non-limiting example of the solvent, it is possible to use toluene, xylene, acetone, chloroform, various alcohol-based solvents, methyl ethyl ketone (MEK), methyl isobutyl ketone (MIBK), ethyl acetate (EA), butyl acetate, dimethylformamide (DMF), dimethylacetamide (DMAc), dimethylsulfoxide (DMSO), N-methyl-pyrrolidone (NMP), and the like, and one or a mixture of two or more may be used. When the first solution and the second solution are used, the solvents included in each of the solutions may also be the same as or different from each other. Even when different solvents are used in the first solution and the second solution, it is preferred that these solvents have compatibility so as to be mixed with each other.

For the process of coating the resin solution, in which the compound represented by Chemical Formula 1 is dissolved, on a substrate, a roll-to-roll process may be used. For example, the process may be performed by a process of unwinding a substrate from a roll on which the substrate is wound, coating the resin solution, in which the compound represented by Chemical Formula 1 is dissolved, on one surface of the substrate, drying the resin solution, and then winding the substrate again on the roll. When the roll-to-roll process is used, it is preferred that the viscosity of the resin solution is determined within a range in which the process may be implemented, and the viscosity may be determined within a range of, for example, 200 to 2,000 cps.

As the coating method, various publicly-known methods may be used, and for example, a die coater may also be used, and it is also possible to use various bar-coating methods such as a comma coater and a reverse comma coater.

After the coating, a drying process is performed. The drying process may be performed under conditions required for removing the solvent. For example, a color conversion film including a fluorescent material such as the compound represented by Chemical Formula 1, having desired thickness and concentration may be obtained on a substrate by carrying out the drying in an oven located close to a coater under a condition to sufficiently evaporate a solvent, in a direction of the substrate progressing during the coating process.

When the monomer which is curable by the resin matrix resin is used as a resin included in the solution, curing, for example, UV curing may be performed before the drying or simultaneously with the drying.

When the compound represented by Chemical Formula 1 is filmed by being extruded with a resin, an extrusion method known in the art may be used, and for example, a color conversion film may be prepared by extruding the compound represented by Chemical Formula 1 with a resin such as a polycarbonate (PC)-based resin, a poly(meth) acrylic resin, and a styrene-acrylonitrile (SAN)-based resin.

According to an exemplary embodiment of the present specification, a protective film or a barrier film may be provided on at least one surface of the color conversion film. As the protective film and the barrier film, films known in the art may be used.

An exemplary embodiment of the present specification provides a backlight unit including the above-described color conversion film. The backlight unit may have a backlight unit configuration known in the art, except that the backlight unit includes the color conversion film. FIG. 1 illustrates a schematic view of a backlight unit structure according to an example. The backlight unit according to FIG. 1 includes a side chain-type light source 101, a reflective plate 102 which surrounds the light source, a light guide plate 103 which guides light directly emitted from the light source, or reflected from the reflective plate, a reflective layer 104 which is provided on one surface of the light guide plate, and a color conversion film 105 which is provided on a surface opposite to a surface facing the reflective layer of the light guide plate. A part indicated as grey in FIG. 1 is a light dispersion pattern 106 of the light guide plate. The light incident inside the light guide plate has an irregular light distribution due to the repetition of an optical process such as reflection, total reflection, refraction, and transmission, and a 2-dimensional light dispersion pattern may be used in order to guide the light distribution to have a uniform luminosity. However, the scope of the present invention is not limited by FIG. 1, and not only a side chain-type light source but also a direct-type light source may also be used as the light source, and the reflective plate or the reflective layer may be omitted or may also be replaced with another configuration, if necessary, and an additional film, for example, a light diffusion film, a light collecting film, a brightness enhancement film, and the like may be further provided, if necessary.

MODE FOR INVENTION

An exemplary embodiment of the present specification provides a display device including the backlight unit. The display device is not particularly limited as long as the device is a display device including a backlight unit, and may be included in a TV, a monitor of a computer, a laptop computer, a mobile phone, and the like.

Comparative Example 1

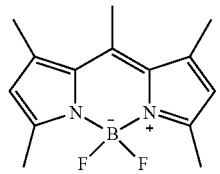

[Compound A]

A film was prepared using difluoro{2-[1-(3,5-dimethyl-2H-pyrrol-2-ylidene-N)ethyl]-3,5-dimethyl-1H-pyrrolato-N}boron (CAS No.: 121207-31-6).

Method for Preparing Film of [Compound A]

[Compound A] was used for preparing a green light emitting color conversion film. Specifically, [Compound A] which is a green light emitting material was added thereto at a ratio of 0.2 wt % compared to 100 wt % of an SAN polymer, diffuser particles were put thereinto at a ratio of 3 wt %, and coating was performed on a PET film using a solution having a solid content of 30% in a normal-butyl acetate solvent, thereby preparing a green light emitting color conversion film. A blue LED light source was used from the prepared green color conversion film, thereby preparing a backlight unit with a size of 160 mm×90 mm. From the prepared backlight unit, optical properties were confirmed, and the prepared backlight unit was continuously driven in a chamber at a temperature of 60° C., thereby evaluating light fastness of the green light emitting film.

Example 1

Example [1]

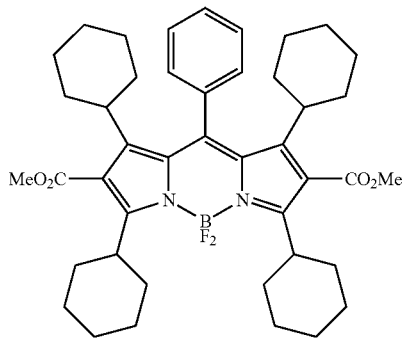

[Compound1]

Molecular Weight: 712.73

Method for Preparing [Compound 1]

After 0.4 g of methyl 1H-pyrrole-3-carboxylate was dissolved in dichloromethane, 0.36 ml of benzaldehyde was added thereto, the resulting mixture was stirred for about 15 minutes, one or two drops of trifluoroacetic acid were added thereto, and then the resulting mixture was stirred at normal temperature for 12 hours. After the mixture was stirred, 0.85 g of 2,3-dichloro-5,6-dicyano-p-benzoquinone was added thereto, and then the resulting mixture was additionally stirred for 15 minutes. 2.56 ml of triethylamine was added to the stirred mixture, and then about 3 ml of a boron trifluoride-ethyl ether complex was slowly added thereto, and the resulting mixture was stirred for another 5 hours. After the stirring was completed, the reaction was terminated with water, extraction was performed using dichloromethane, the extracted material was concentrated, and a dimethyl 5,5-difluoro-10-phenyl-5H-414,514-dipyrrolo[1,2-c:2',1'-f][1,3,2]diazaborinine-2,8-dicarboxylate intermediate was synthesized using column chromatography. After dimethyl 5,5-difluoro-10-phenyl-5H-414,514-dipyrrolo[1,2-c:2',1'-f][1,3,2]diazaborinine-2,8-dicarboxylate was dissolved in dimethylformamide, potassium cyclohexyltrifluoroborate and Mn(OAc)$_3$ were added thereto, the resulting mixture was stirred at 80° C. for 1 hour, and then the reaction was terminated. The organic layer was extracted using water and ethyl acetate, the extracted material was concentrated, and [Compound 1] was secured using column chromatography.

1H NMR (500 MHz, CDCl$_3$) δ 7.59 (t, J=7.4 Hz, 1H), 7.48 (t, J=7.5 Hz, 2H), 7.37 (d, J=7.3 Hz, 2H), 3.82 (s, 6H), 3.47 (t, J=11.9 Hz, 2H), 1.94 (d, J=10.4 Hz, 4H), 1.77 (dd, J=28.9, 12.8 Hz, 7H), 1.55 (s, 4H), 1.62-1.13 (m, 39H), 0.91 (d, J=13.7 Hz, 4H), 0.43 (s, 3H).

Method for Preparing Film Using [Compound 1]

The prepared [Compound 1] was used for preparing a green light emitting color conversion film. Specifically, [Compound 1] which is a green light emitting material was added thereto at a ratio of 0.2 wt % compared to 100 wt % of an SAN polymer, diffuser particles were put thereinto at a ratio of 3 wt %, and coating was performed on a PET film using a solution having a solid content of 30% in a normal-butyl acetate solvent, thereby preparing a green light emitting color conversion film. A blue LED light source was used from the prepared green color conversion film, thereby preparing a backlight unit with a size of 160 mm×90 mm. From the prepared backlight unit, optical properties were confirmed, and the prepared backlight unit was continuously driven in a chamber at a temperature of 60° C., thereby evaluating light fastness of the green light emitting film.

Example [2]

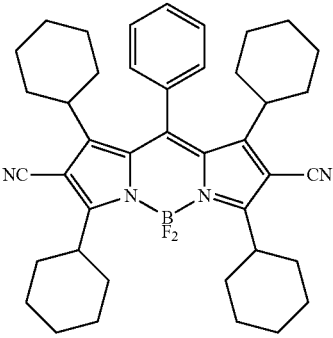

[Compound 2]

Molecular Weight: 646.68

Method for Preparing [Compound 2]

After 0.4 g of methyl 1H-pyrrole-3-carbonitrile was dissolved in dichloromethane, 0.36 ml of benzaldehyde was added thereto, the resulting mixture was stirred for about 15 minutes, one or two drops of trifluoroacetic acid were added thereto, and then the resulting mixture was stirred at normal temperature for 12 hours. After the mixture was stirred, 0.85 g of 2,3-dichloro-5,6-dicyano-p-benzoquinone was added thereto, and then the resulting mixture was additionally stirred for 15 minutes. 2.56 ml of triethylamine was added to the stirred mixture, and then about 3 ml of a boron trifluoride-ethyl ether complex was slowly added thereto, and the resulting mixture was stirred for another 5 hours. After the stirring was completed, the reaction was terminated with water, extraction was performed using dichloromethane, the extracted material was concentrated, and a 5,5-difluoro-10-phenyl-5H-414,514-dipyrrolo[1,2-c:2',1'-f][1,3,2]diazaborinine-2,8-dicarbonitrile intermediate was synthesized using column chromatography. After 5,5-difluoro-10-phenyl-5H-414,514-dipyrrolo[1,2-c:2',1'-f][1,3,2]

diazaborinine-2,8-dicarbonitrile was dissolved in dimethylformamide, potassium cyclohexyltrifluoroborate and Mn(OAc)$_3$ were added thereto, the resulting mixture was stirred at 80° C. for 1 hour, and then the reaction was terminated. The organic layer was extracted using water and ethyl acetate, the extracted material was concentrated, and [Compound 2] was secured using column chromatography.

1H NMR (500 MHz, CDCl$_3$) δ 7.67 (d, J=7.6 Hz, 1H), 7.55 (t, J=7.8 Hz, 2H), 7.36 (dd, J=8.1, 1.1 Hz, 2H), 3.47 (dd, J=16.6, 7.4 Hz, 2H), 1.98 (dd, J=21.6, 11.9 Hz, 4H), 1.90 (d, J=11.3 Hz, 8H), 1.75 (dt, J=12.9, 7.4 Hz, 6H), 1.58 (d, J=13.3 Hz, 4H), 1.54-1.36 (m, 8H), 1.33-1.23 (m, 6H), 1.13 (qd, J=13.2, 9.7 Hz, 2H), 0.48 (dt, J=13.0, 8.1 Hz, 4H).

Method for Preparing Film Using [Compound 2]

The prepared [Compound 2] was used for preparing a green light emitting color conversion film. Specifically, [Compound 2] which is a green light emitting material was added thereto at a ratio of 0.2 wt % compared to 100 wt % of an SAN polymer, diffuser particles were put thereinto at a ratio of 3 wt %, and coating was performed on a PET film using a solution having a solid content of 30% in a normal-butyl acetate solvent, thereby preparing a green light emitting color conversion film. A blue LED light source was used from the prepared green color conversion film, thereby preparing a backlight unit with a size of 160 mm×90 mm. From the prepared backlight unit, optical properties were confirmed, and the prepared backlight unit was continuously driven in a chamber at a temperature of 60° C., thereby evaluating light fastness of the green light emitting film.

Example [3]

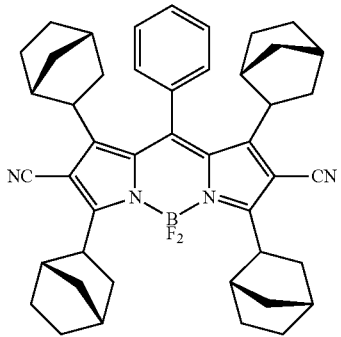

[Compound 3]

[Compound 3] was prepared in the same manner as in the method for preparing [Compound 2] in Example 2, except that potassium bicyclohexyltrifluoroborate was used instead of potassium cyclohexyltrifluoroborate.

A green light emitting color conversion film and a backlight unit were prepared using the prepared [Compound 3] in the same manner as in Example 1, except that [Compound 3] was used instead of [Compound 1]. From the prepared backlight unit, it was confirmed that the color was converted.

Example [4]

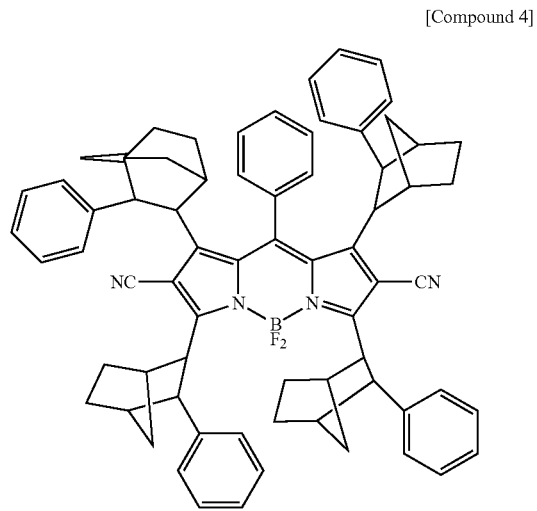

[Compound 4]

[Compound 4] was prepared in the same manner as in the method for preparing [Compound 2] in Example 2, except that potassium phenyl bicyclohexyltrifluoroborate was used instead of potassium cyclohexyltrifluoroborate.

A green light emitting color conversion film and a backlight unit were prepared using the prepared [Compound 4] in the same manner as in Example 1, except that [Compound 4] was used instead of [Compound 1]. From the prepared backlight unit, it was confirmed that the color was converted.

Example [5]

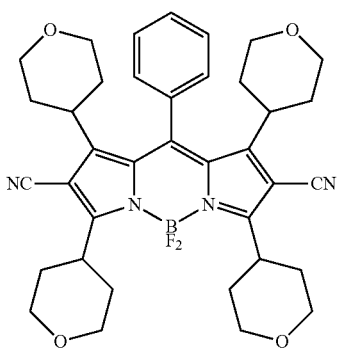

[Compound 5]

[Compound 5] was prepared in the same manner as in the method for preparing [Compound 2] in Example 2, except that potassium tetrahydropyrinetrifluoroborate was used instead of potassium cyclohexyltrifluoroborate.

A green light emitting color conversion film and a backlight unit were prepared using the prepared [Compound 5] in the same manner as in Example 1, except that [Compound 5] was used instead of [Compound 1]. From the prepared backlight unit, it was confirmed that the color was converted.

The optical properties of the films prepared from Comparative Example 1 and Examples 1 and 2 were compared, and the results are shown in the following Table 3.

TABLE 3

|  |  | Comparative Example 1 | Example 1 | Example 2 |
|---|---|---|---|---|
| Max intensity | Blue | 0.198 | 0.10 | 0.12 |
|  | Green | 0.160 | 0.07 | 0.05 |
| Max wavelength | Blue | 449 | 450 | 450 |
|  | Green | 536 | 540 | 535 |
| Green | Width (nm) | 44 | 42 | 43 |

The light fastness results of the films prepared from Comparative Example 1 and Examples 1 and 2 are shown in the following Table 4.

TABLE 4

| | % Green Intensity (% compared to the initial value) | | |
|---|---|---|---|
| Evaluation time | Comparative Example 1 | Example 1 | Example 2 |
| 500 hr | 21% | 90% | 95% |

The invention claimed is:
1. A compound of Chemical Formula 1:

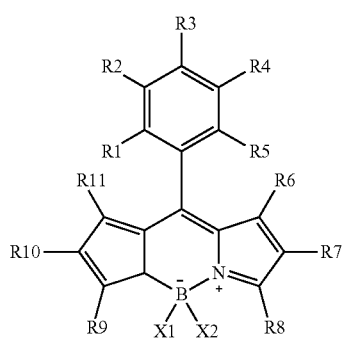

[Chemical Formula 1]

wherein in Chemical Formula 1:
R1 to R6, R8, R9, and R11 are the same as or different from each other, and are each independently hydrogen, deuterium a halogen group, a nitrile group, a nitro group, a hydroxy group, a carboxy group (—COOH), —C(=O)OR, an ether group, an ester group, an imide group, an amide group, a substituted or unsubstituted alkyl group, a substituted or unsubstituted cycloalkyl group, a substituted or unsubstituted alkoxy group, a substituted or unsubstituted aryloxy group, a substituted or unsubstituted alkylthioxy group, a substituted or unsubstituted arylthioxy group, a substituted or unsubstituted alkyl sulfoxy group, a substituted or unsubstituted aryl sulfoxy group, a substituted or unsubstituted alkenyl group, a substituted or unsubstituted silyl group, a substituted or unsubstituted boron group, a substituted or unsubstituted amine group, a substituted or unsubstituted arylphosphine group, a substituted or unsubstituted phosphine oxide group, a substituted or unsubstituted aryl group, a substituted or unsubstituted heteroaryl group, or a substituted or unsubstituted aliphatic heterocyclic group;
R7 and R10 are the same as or different from each other, and are each independently deuterium, a halogen group, a nitrile group, a nitro group, a hydroxy group, a carboxy group (—COOH), —C(=O)OR", an ether group, an ester group, an imide group, an amide group, a substituted or unsubstituted alkyl group, a substituted or unsubstituted cycloalkyl group, a substituted or unsubstituted alkoxy group, a substituted or unsubstituted aryloxy group, a substituted or unsubstituted alkylthioxy group, a substituted or unsubstituted arylthioxy group, a substituted or unsubstituted alkylsulfoxy group, a substituted or unsubstituted arylsulfoxy group, a substituted or unsubstituted alkenyl group, a substituted or unsubstituted silyl group, a substituted or unsubstituted boron group, a substituted or unsubstituted amine group, a substituted or unsubstituted arylphosphine group, a substituted or unsubstituted phosphine oxide group, a substituted or unsubstituted aryl group, a substituted or unsubstituted heteroaryl group, or a substituted or unsubstituted aliphatic heterocyclic group;
R is a substituted or unsubstituted alkyl group or a substituted or unsubstituted aryl group;
R" is a substituted or unsubstituted alkyl group, a substituted or unsubstituted cycloalkyl group, a substituted or unsubstituted fluoroalkyl group, or a substituted or unsubstituted aryl group;
at least one of R6 to R11 is a steric hindrance imparting group; and
X1 and X2 are the same as or different from each other, and are each independently a halogen group, a nitrile group, a substituted or unsubstituted alkoxy group, a substituted or unsubstituted aryloxy group, or a substituted or unsubstituted aryl group, or X1 and X2 combine with each other to form a substituted or unsubstituted ring,
wherein at least one of R6, R8, R9, and R11 is —C(=O)OR, a monocyclic or polycyclic cycloalkyl group or a monocyclic or polycyclic aliphatic heterocyclic group, R is a substituted or unsubstituted alkyl group or a substituted or unsubstituted aryl group, and the others of R6 to R8, R9, and R11 are hydrogen, deuterium, a nitrile group, or a substituted or unsubstituted alkyl group.
2. A compound of Chemical Formula 1:

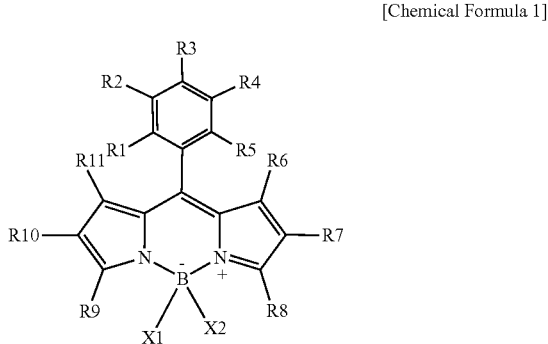

[Chemical Formula 1]

wherein in Chemical Formula 1:
R1 to R6, R8, R9, and R11 are the same as or different from each other, and are each independently hydrogen, deuterium, a halogen group, a nitrile group, a nitro group, a hydroxy group, a carboxy group (—COOH), —C(=O)OR, an ether group, an ester group, an imide group, an amide group, a substituted or unsubstituted alkyl group, a substituted or unsubstituted cycloalkyl group, a substituted or unsubstituted alkoxy group, a substituted or unsubstituted aryloxy group, a substituted or unsubstituted alkylthioxy group, a substituted or unsubstituted arylthioxy group, a substituted or unsubstituted alkylsulfoxy group, a substituted or unsubstituted arylsulfoxy group, a substituted or unsubstituted alkenyl group, a substituted or unsubstituted silyl group, a substituted or unsubstituted boron group, a substituted or unsubstituted amine group, a substituted or unsubstituted arylphosphine group, a substituted or unsubstituted phosphine oxide group, a substituted or unsubstituted aryl group, a substituted or unsubstituted heteroaryl group, or a substituted or unsubstituted aliphatic heterocyclic group;

R7 and R10 are the same as or different from each other, and are each independently deuterium, a halogen group, a nitrile group, a nitro group, a hydroxy group, a carboxy group (—COOH), —C(=O)OR", an ether group, an ester group, an imide group, an amide group, a substituted or unsubstituted alkyl group, a substituted or unsubstituted cycloalkyl group, a substituted or unsubstituted alkoxy group, a substituted or unsubstituted aryloxy group, a substituted or unsubstituted alkylthioxy group, a substituted or unsubstituted arylthioxy group, a substituted or unsubstituted alkylsulfoxy group, a substituted or unsubstituted arylsulfoxy group, a substituted or unsubstituted alkenyl group, a substituted or unsubstituted silyl group, a substituted or unsubstituted boron group, a substituted or unsubstituted amine group, a substituted or unsubstituted arylphosphine group, a substituted or unsubstituted phosphine oxide group, a substituted or unsubstituted aryl group, a substituted or unsubstituted heteroaryl group, or a substituted or unsubstituted aliphatic heterocyclic group;

R is a substituted or unsubstituted alkyl group, or a substituted or unsubstituted aryl group;

R" is a substituted or unsubstituted alkyl group, a substituted or unsubstituted cycloalkyl group, a substituted or unsubstituted fluoroalkyl group, or a substituted or unsubstituted aryl group;

at least one of R6 to R11 is a steric hindrance imparting group; and

X1 and X2 are the same as or different from each other, and are each independently a halogen group, a nitrile group, a substituted or unsubstituted alkoxy group, a substituted or unsubstituted aryloxy group, or a substituted or unsubstituted aryl group, or X1 and X2 combine with each other to form a substituted or unsubstituted ring, wherein at least one of R6 and R8 and at least one of R9 and R11 are —C(=O)OCH₃, —C(=O)OCH₂CH₃, a substituted or unsubstituted cyclohexyl group a substituted or unsubstituted cyclopentyl group a substituted or unsubstituted cycloheptyl group, a substituted or unsubstituted cyclooctyl group, a substituted or unsubstituted bicycloheptyl group, a substituted or unsubstituted bicyclooctyl group, a substituted or unsubstituted tetrahydropyran group, or a substituted or unsubstituted adamantane group, and the others of R6, R8, R9, and R11 are hydrogen, deuterium, a nitrile group, or a substituted or unsubstituted methyl group.

3. The compound of claim 1, wherein at least one of R6 and R8 and at least one of R9 and R11 are the same as or different from each other, and are each independently —C(=O)OCH₃; —C(=O)OCH₂CH₃; a cyclohexyl group which is unsubstituted or substituted with a methyl group or a methoxy group; a cyclopentyl group; a cycloheptyl group; a cyclooctyl group; a bicycloheptyl group which is unsubstituted or substituted with a phenyl group; a tetrahydropyran group; or a substituted or unsubstituted adamantane group, and the others of R6, R8, R9, and R11 are hydrogen, deuterium, a nitrile group, or a substituted or unsubstituted methyl group.

4. The compound of claim 1, wherein R1 to R5 are the same as or different from each other, and are each hydrogen, deuterium, a substituted or unsubstituted alkyl group, a substituted or unsubstituted alkoxy group, or —C(=O)OR', and R' is an alkyl group having 1 to 20 carbon atoms or an aryl group having 6 to 20 carbon atoms.

5. The compound of claim 1, wherein X1 and X2 are the same as or different from each other, and are each a halogen group.

6. The compound of claim 1, wherein R7 and R10 are the same as or different from each other, and are each independently a nitrile group, or —C(=O)OR", and R" is an alkyl group, a cycloalkyl group, a fluoroalkyl group, or an aryl group.

7. A compound of Chemical Formula 1:

[Chemical Formula 1]

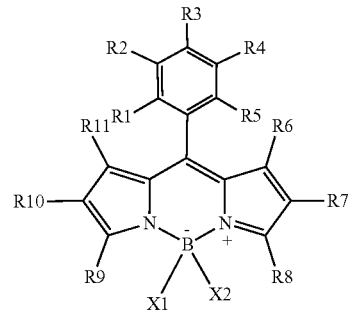

wherein in Chemical Formula 1:

R1 to R6, R8, R9, and R11 are the same as or different from each other, and are each independently hydrogen, deuterium, a halogen group, a nitrile group, a nitro group, a hydroxy group, a carboxy group (—COOH), —C(=O)OR, an ether group, an ester group, an imide group, an amide group, a substituted or unsubstituted alkyl group, a substituted or unsubstituted cycloalkyl group, a substituted or unsubstituted alkoxy group, a substituted or unsubstituted aryloxy group, a substituted or unsubstituted alkylthioxy group, a substituted or unsubstituted arylthioxy group, a substituted or unsubstituted alkylsulfoxy group, a substituted or unsubstituted arylsulfoxy group, a substituted or unsubstituted alkenyl group, a substituted or unsubstituted silyl group, a substituted or unsubstituted boron group, a substituted or unsubstituted amine group, a substituted or unsubstituted arylphosphine group, a substituted or unsubstituted phosphine oxide group, a substituted or unsubstituted aryl group, a substituted or unsubstituted heteroaryl group, or a substituted or unsubstituted aliphatic heterocyclic group;

R7 and R10 are the same as or different from each other, and are each independently deuterium, a halogen group, a nitrile group, a nitro group, a hydroxy group, a carboxy group (—COOH), —C(=O)OR", an ether group, an ester group, an imide group, an amide group, a substituted or unsubstituted alkyl group, a substituted or unsubstituted cycloalkyl group, a substituted or unsubstituted alkoxy group, a substituted or unsubstituted aryloxy group, a substituted or unsubstituted alkylthioxy group, a substituted or unsubstituted arylthioxy group, a substituted or unsubstituted alkylsulfoxy group, a substituted or unsubstituted arylsulfoxy group, a substituted or unsubstituted alkenyl group, a substituted or unsubstituted silyl group, a substituted or unsubstituted boron group, a substituted or unsubstituted amine group, a substituted or unsubstituted arylphosphine group, a substituted or unsubstituted phosphine oxide group, a substituted or unsubstituted aryl group, a substituted or unsubstituted heteroaryl group, or a substituted or unsubstituted aliphatic heterocyclic group;

R is a substituted or unsubstituted alkyl group, or a substituted or unsubstituted aryl group;

R" is a substituted or unsubstituted alkyl group, a substituted or unsubstituted cycloalkyl group, a substituted or unsubstituted fluoroalkyl group, or a substituted or unsubstituted aryl group;

at least one of R6 to R11 is a steric hindrance imparting group; and

X1 and X2 are the same as or different from each other, and are each independently a halogen group, a nitrile group, a substituted or unsubstituted alkoxy group, a substituted or unsubstituted aryloxy group, or a substituted or unsubstituted aryl group, or X1 and X2 combine with each other to form a substituted or unsubstituted ring, wherein a combination of R1 to R6, R8, R9, R11, X1, and X2 is optionally selected from 1A to 41A of the following Table 1, and a combination of R7 and R10 is optionally selected from 1B to 15B of the following Table 2:

TABLE 1

| Combination | R1 to R5 | R6 | R8 | R9 | R11 | X1, X2 |
|---|---|---|---|---|---|---|
| 1A | —H | cyclohexyl | cyclohexyl | cyclohexyl | cyclohexyl | —F |
| 2A | —H | cyclohexyl-CH₃ | cyclohexyl-CH₃ | cyclohexyl-CH₃ | cyclohexyl-CH₃ | —F |
| 3A | —H | cyclohexyl | cyclohexyl-CH₃ | cyclohexyl-CH₃ | cyclohexyl | —F |
| 4A | —H | cyclohexyl-CH₃ | cyclohexyl-CH₃ | cyclohexyl-CH₃ | cyclohexyl | —F |
| 5A | —H | cyclohexyl-CH₃ | cyclohexyl | cyclohexyl-CH₃ | cyclohexyl | —F |

TABLE 1-continued

| Combination | R1 to R5 | R6 | R8 | R9 | R11 | X1, X2 |
|---|---|---|---|---|---|---|
| 6A | —H | —CH₃ | 2-methylcyclohexyl | 2-methylcyclohexyl | —CH₃ | —F |
| 7A | —H | —CH₃ | cyclohexyl | 2-methylcyclohexyl | —CH₃ | —F |
| 8A | —H | | cyclopentyl | cyclopentyl | cyclopentyl | cyclopentyl | —F |
| 9A | —H | | cyclopentyl | cyclopentyl | cyclopentyl | cyclohexyl | —F |
| 10A | —H | | cycloheptyl | cycloheptyl | cycloheptyl | cycloheptyl | —F |
| 11A | —H | | cyclohexyl | cycloheptyl | cycloheptyl | cycloheptyl | —F |
| 12A | —H | | cyclohexyl | cycloheptyl | cycloheptyl | cyclohexyl | —F |
| 13A | —H | | cyclohexyl | cyclohexyl | cycloheptyl | cyclohexyl | —F |

TABLE 1-continued
| Combination | R1 to R5 | R6 | R8 | R9 | R11 | X1, X2 |
|---|---|---|---|---|---|---|
| 14A | —H | 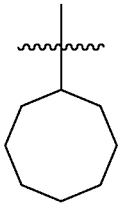 [SMILES: *C1CCCCCCC1] | 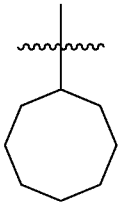 [SMILES: *C1CCCCCCC1] | 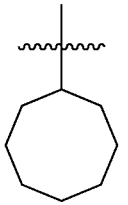 | 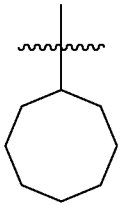 [SMILES: *C1CCCCCCC1] | —F |
| 15A | —H | 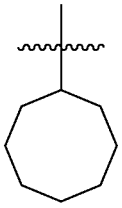 [SMILES: *C1CCCCCCC1] | 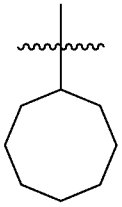 [SMILES: *C1CCCCCCC1] | 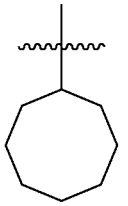 [SMILES: *C1CCCCCCC1] | 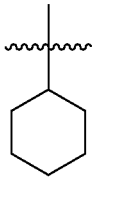 | —F |
| 16A | —H | 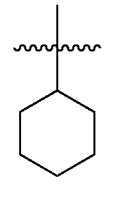 | 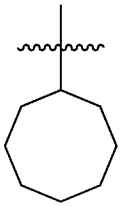 [SMILES: *C1CCCCCCC1] | 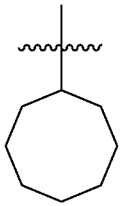 [SMILES: *C1CCCCCCC1] | 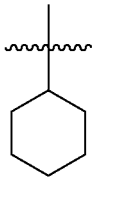 | —F |
| 17A | —H | 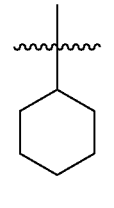 | 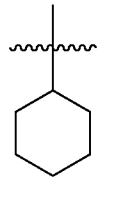 | 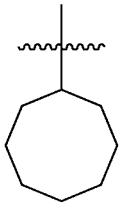 | 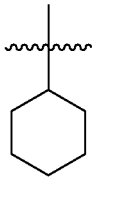 | —F |
| 18A | —H | 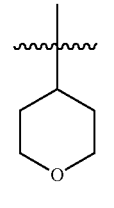 | 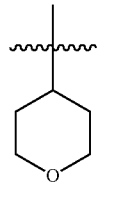 | 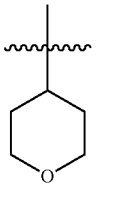 | 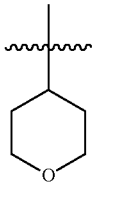 | —F |
| 19A | —H | 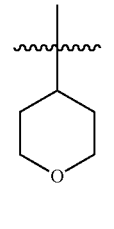 | 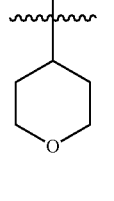 | 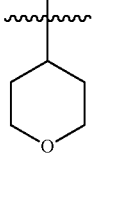 | 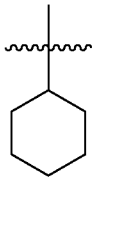 | —F |
| 20A | —H | 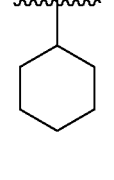 | 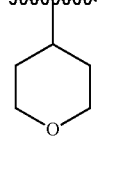 | 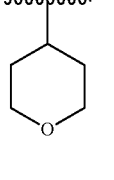 | 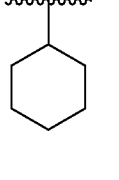 | —F |

TABLE 1-continued

| Combination | R1 to R5 | R6 | R8 | R9 | R11 | X1, X2 |
|---|---|---|---|---|---|---|
| 21A | —H | cyclohexyl | cyclohexyl | tetrahydropyran-4-yl | cyclohexyl | —F |
| 22A | —H | norbornyl | norbornyl | norbornyl | norbornyl | —F |
| 23A | —H | cyclohexyl | norbornyl | norbornyl | norbornyl | —F |
| 24A | —H | cyclohexyl | norbornyl | norbornyl | cyclohexyl | —F |
| 25A | —H | cyclohexyl | cyclohexyl | norbornyl | cyclohexyl | —F |
| 26A | —H | cyclohexyl | 2-methylcyclohexyl | norbornyl | cyclohexyl | —F |
| 27A | —H | cycloheptyl | 2-methylcyclohexyl | norbornyl | cyclohexyl | —F |
| 28A | —H | phenylnorbornyl | phenylnorbornyl | phenylnorbornyl | phenylnorbornyl | —F |

TABLE 1-continued

| Combination | R1 to R5 | R6 | R8 | R9 | R11 | X1, X2 |
|---|---|---|---|---|---|---|
| 29A | —H | cyclohexyl | 2-phenylnorbornyl | 2-phenylnorbornyl | cyclohexyl | —F |
| 30A | —H | cyclohexyl | adamantyl | adamantyl | cyclohexyl | —F |
| 31A | —H | cyclohexyl | cyclohexyl | adamantyl | cyclohexyl | —F |
| 32A | —H | —CH₃ | adamantyl | adamantyl | —CH₃ | —F |
| 33A | —H | —CH₃ | adamantyl | adamantyl | cyclohexyl | —F |
| 34A | —H | 2-methoxycyclohexyl | 2-methoxycyclohexyl | 2-methoxycyclohexyl | 2-methoxycyclohexyl | —F |
| 35A | —H | 2-methoxycyclohexyl | 2-methoxycyclohexyl | 2-methoxycyclohexyl | cyclohexyl | —F |

TABLE 1-continued

| Combination | R1 to R5 | R6 | R8 | R9 | R11 | X1, X2 |
|---|---|---|---|---|---|---|
| 36A | —H | cyclohexyl | 2-methoxycyclohexyl | 2-methoxycyclohexyl | cyclohexyl | —F |
| 37A | —H | cyclohexyl | cyclohexyl | 2-methoxycyclohexyl | cyclohexyl | —F |
| 38A | —H | 2-methoxycyclohexyl | cyclohexyl | 2-methoxycyclohexyl | cyclohexyl | —F |
| 39A | —H | 2-methoxycyclohexyl | 2-methylcyclohexyl | 2-methylcyclohexyl | 2-methoxycyclohexyl | —F |
| 40A | —H | 2-methoxycyclohexyl | 2-methylcyclohexyl | 2-methylcyclohexyl | cyclohexyl | —F |
| 41A | —H | 2-methoxycyclohexyl | cyclohexyl | 2-methylcyclohexyl | cyclohexyl | —F |

TABLE 2

| Combination | R7 | R10 |
|---|---|---|
| 1B | —CN | —CN |
| 2B | —CO$_2$CH$_3$ | —CO$_2$CH$_3$ |
| 3B | —CO$_2$C$_6$H$_{11}$ | —CO$_2$C$_6$H$_{11}$ |
| 4B | —CO$_2$C$_6$H$_5$ | —CO$_2$C$_6$H$_5$ |
| 5B | —CF$_3$ | —CF$_3$ |
| 6B | —CN | —CO$_2$CH$_3$ |
| 7B | —CN | —CO$_2$C$_6$H$_{11}$ |
| 8B | —CN | —CO$_2$C$_6$H$_5$ |
| 9B | —CN | —CF$_3$ |
| 10B | —CO$_2$CH$_3$ | —CO$_2$C$_6$H$_{11}$ |
| 11B | —CO$_2$CH$_3$ | —CO$_2$C$_6$H$_5$ |
| 12B | —CO$_2$CH$_3$ | —CF$_3$ |
| 13B | —CO$_2$C$_6$H$_{11}$ | —CF$_3$ |
| 14B | —CO$_2$C$_6$H$_{11}$ | —CO$_2$C$_6$H$_5$ |
| 15B | —CO$_2$C$_6$H$_5$ | —CF$_3$. |

8. A color conversion film comprising:
a resin matrix; and
the compound of claim 1, which is dispersed in the resin matrix.

9. A backlight unit comprising the color conversion film of claim 8.

10. A display device comprising the backlight unit of claim 9.

11. The compound of claim 2, wherein R1 to R5 are the same as or different from each other, and are each hydrogen, deuterium, a substituted or unsubstituted alkyl group, a substituted or unsubstituted alkoxy group, or —C(=O)OR', and R' is an alkyl group having 1 to 20 carbon atoms or an aryl group having 6 to 20 carbon atoms.

12. The compound of claim 2, wherein X1 and X2 are the same as or different from each other, and are each a halogen group.

13. The compound of claim 2, wherein R7 and R10 are the same as or different from each other, and are each independently a nitrile group, or —C(=O)OR", and R" is an alkyl group, a cycloalkyl group, a fluoroalkyl group, or an aryl group.

14. A color conversion film comprising:
   a resin matrix; and
   the compound of claim 2, which is dispersed in the resin matrix.

15. A backlight unit comprising the color conversion film of claim 14.

16. A display device comprising the backlight unit of claim 15.

17. A color conversion film comprising:
   a resin matrix; and
   the compound of claim 7, which is dispersed in the resin matrix.

18. A backlight unit comprising the color conversion film of claim 17.

19. A display device comprising the backlight unit of claim 18.

* * * * *